(12) United States Patent
Shinagawa

(10) Patent No.: US 9,169,810 B2
(45) Date of Patent: Oct. 27, 2015

(54) FUEL VAPOR PROCESSING APPARATUS

(71) Applicant: AISAN KOGYO KABUSHIKI KAISHA, Obu-shi, Aichi-ken (JP)

(72) Inventor: Masanobu Shinagawa, Ama (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 280 days.

(21) Appl. No.: 13/907,462

(22) Filed: May 31, 2013

(65) Prior Publication Data

US 2013/0319249 A1 Dec. 5, 2013

(30) Foreign Application Priority Data

Jun. 1, 2012 (JP) ................................ 2012-126050

(51) Int. Cl.
*F02M 25/08* (2006.01)
*B01D 53/02* (2006.01)
*B01D 53/04* (2006.01)

(52) U.S. Cl.
CPC ........ *F02M 25/0854* (2013.01); *B01D 53/0438* (2013.01)

(58) Field of Classification Search
CPC ....................... F02M 35/0218; F02M 25/0854

USPC .............................. 96/143, 131; 123/518–521
See application file for complete search history.

(56) References Cited

U.S. PATENT DOCUMENTS

2004/0094132 A1* 5/2004 Fujimoto et al. .............. 123/519

FOREIGN PATENT DOCUMENTS

| JP | 59181264 U | 12/1984 |
| JP | 2002332922 A | 11/2002 |
| JP | 2012047150 A | 3/2012 |

* cited by examiner

*Primary Examiner* — Duane Smith
*Assistant Examiner* — Adam W Bergfelder
(74) *Attorney, Agent, or Firm* — Conley Rose, P.C.

(57) ABSTRACT

A fuel vapor processing apparatus may include a container including an atmospheric introduction portion, through which atmospheric air is introduce into the container. An adsorption material may be contained in the container and may be configured to adsorb fuel vapor and to allow the adsorbed fuel vapor to be desorbed from the adsorption material as the atmospheric air introduced into the container flows through the adsorption material. A heater may heat the adsorption material for promoting desorption of fuel vapor and may have a heating value decreasing along a length of the heater in a flow direction of the atmospheric air through the adsorption material for desorption of fuel vapor.

5 Claims, 3 Drawing Sheets

FUEL VAPOR PROCESSING APPARATUS

This application claims priority to Japanese patent application serial number 2012-126050, the contents of which are incorporated herein by reference.

BACKGROUND OF THE INVENTION

1. Field of the Invention

Embodiments of the present invention mainly relate to fuel vapor processing apparatus, in which fuel vapor is adsorbed by an adsorption material contained in a container, the fuel vapor adsorbed by the adsorption material is desorbed (or purge) during driving of an engine, and a heater is provided for heating the adsorption material for promoting desorption of fuel vapor.

2. Description of the Related Art

A known fuel vapor processing apparatus configured as described above is disclosed in JF-A-2002-332922. The known fuel vapor processing apparatus has a container having an internal space divided into a main adsorption chamber and an auxiliary adsorption chamber. Each of the main and auxiliary adsorption chambers has an adsorption material contained therein and also has a heater for heating the adsorption material. The main adsorption chamber communicates with a tank port and a purge port. The tank port is connected to a fuel tank that may produce fuel vapor. The purge port communicates with an intake pipe of an engine. The auxiliary adsorption chamber communicates with an atmospheric port for introduction of the atmospheric air. The tank port and the purge port communicating with the main adsorption chamber are positioned adjacent to each other. One side of the main adsorption chamber positioned further from the tank port and the purge post communicates with one side of the auxiliary chamber positioned further from the atmospheric port.

Fuel vapor produced within the fuel tank may enter the main adsorption chamber via the tank port and may be adsorbed by the adsorption material contained in the main adsorption chamber. A part of the fuel vapor that has not been adsorbed by the adsorption material of the main adsorption chamber may flow from the main adsorption chamber into the auxiliary adsorption chamber and may be adsorbed by the adsorption material contained in the auxiliary adsorption chamber. As the engine is driven, the air may be drawn from within the container into the engine via the purge port, so that air may flow into the container. In this way, the fuel vapor may be desorbed from the adsorption materials. As the fuel vapor is desorbed from the adsorption materials, the adsorption materials may be cooled to cause reduction in the adsorption ability. However, the heat of the heaters may inhibit such cooling of the adsorption materials.

After the engine has been stopped, desorption of fuel vapor by the flow of air may not occur. However, in this state, it may be necessary to inhibit fuel vapor that has been once adsorbed by the adsorption materials from being released to the atmosphere. To do this, it may be necessary to reduce in advance at least the fuel vapor adsorbed by a part of the adsorption material positioned near the atmospheric air introduction port. In order to enable this reduction, it may be necessary to design the heater to have a large heating capacity for promoting desorption. However, making the heating capacity larger is not preferable because the energy consumption may be increased.

Therefore, there has been a need in the art for a fuel vapor processing apparatus that can increase the fuel vapor desorption ability of a part of the adsorption material positioned nearer to the atmospheric air introduction portion without need of increasing the heating capacity of the heater.

SUMMARY Of THE INVENTION

In one aspect according to the present teachings, a fuel vapor processing apparatus may include a container including an atmospheric introduction portion, through which atmospheric air is introduce into the container. An adsorption material may be contained in the container and may be configured to adsorb fuel vapor and to allow the adsorbed fuel vapor to be desorbed from the adsorption material as the atmospheric air introduced into the container flows through the adsorption material. A heater may heat the adsorption material for promoting desorption of fuel vapor and may have a heating value decreasing along a length of the heater in a flow direction of the atmospheric air through the adsorption material for desorption of fuel vapor.

DETAILED DESCRIPTION OF THE INVENTION

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, a fuel vapor processing apparatus may include a container including an atmospheric introduction portion, through which atmospheric air is introduce into the container. An adsorption material may be contained in the container and may be configured to adsorb fuel vapor and to allow the adsorbed fuel vapor to be desorbed from the adsorption material as the atmospheric air introduced into the container flows through the adsorption material. A heater may heat the adsorption material for promoting desorption of fuel vapor. The adsorption material heated by the heater may have such a temperature distribution that a temperature of the adsorption material becomes progressively decreases in a flow direction of the atmospheric air through the adsorption material for desorption of fuel vapor.

Therefore, without accompanying increase its the power consumption of the first heater as a whole, it is possible to inhibit the fuel vapor from being remained at the adsorption material located nearer to the atmospheric air introduction portion. Hence, it is possible to inhibit fuel vapor adsorbed by the adsorption material located nearer to the atmospheric air introduction portion from being discharged to the atmosphere during the desorption process.

The heater may be an electrical resistance heater that generates Joule heat. Use of the electric resistance heater allows easy adjustment of a distribution of an electric resistance value. In addition, a single heater can easily realize a progressively changing temperature distribution.

Embodiments of the present invention will be described with reference to the drawings.

<First Embodiment>

Figure 1:
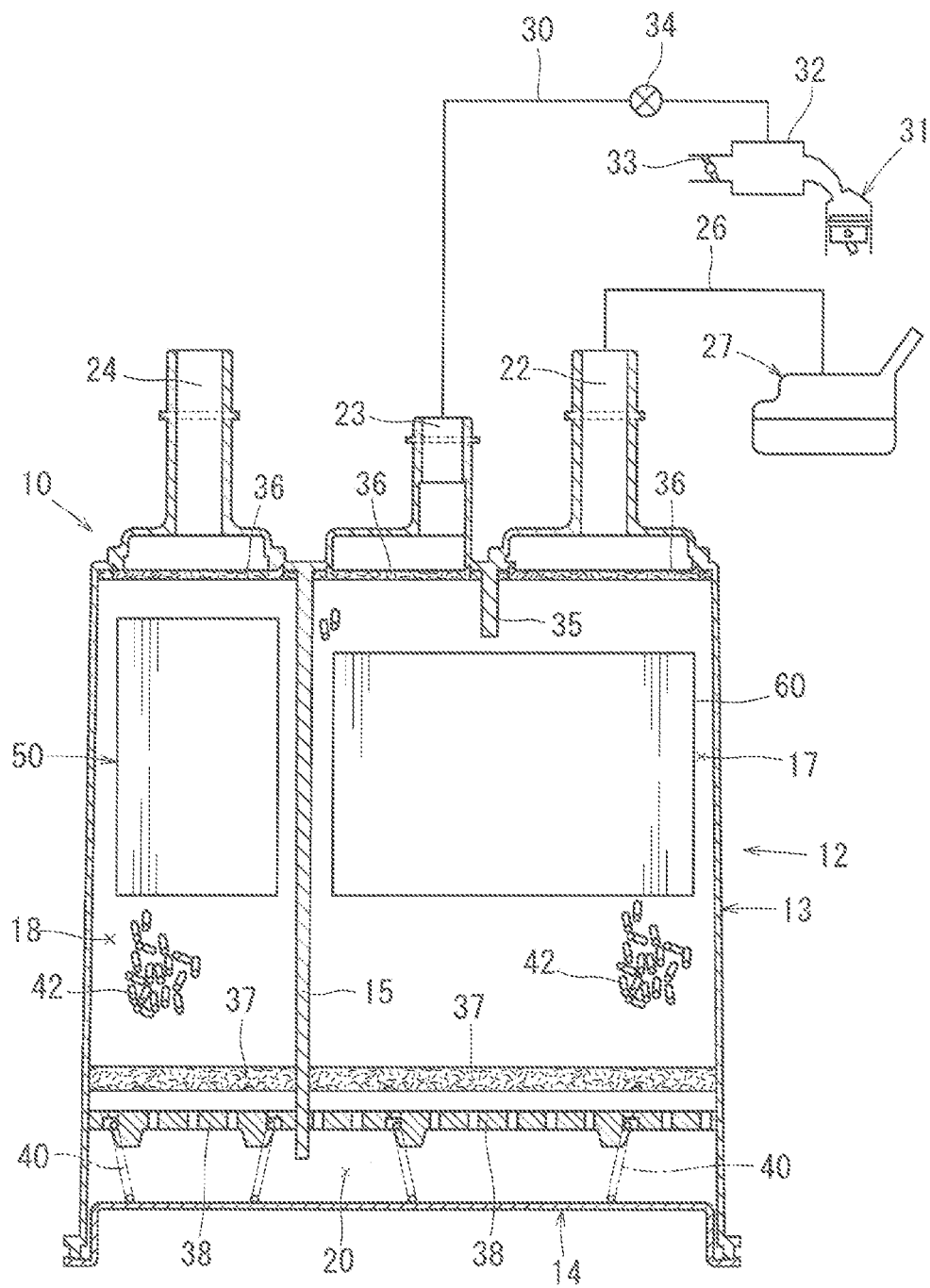
FIG. 1 is a schematic sectional view of a fuel vapor processing system incorporating a fuel vapor processing apparatus according to a first embodiment.
Figure 2:
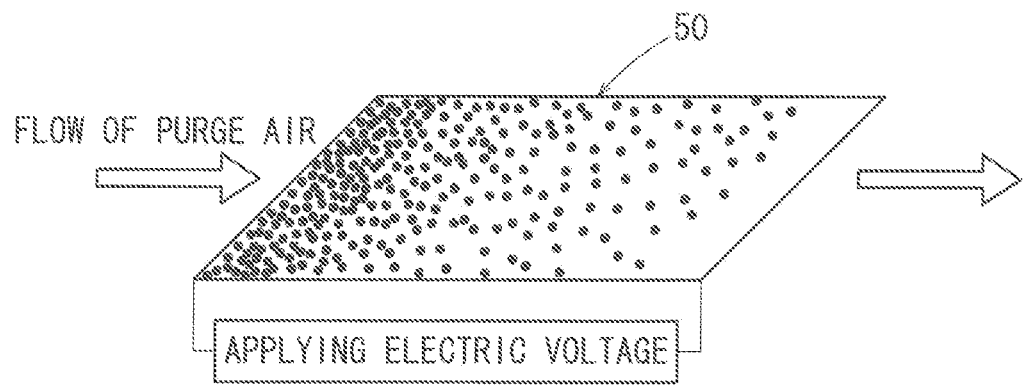
FIG. 2 is a schematic perspective view of a first heater of the fuel vapor processing apparatus.

Referring to FIGS. 1 and 2, there is shown a fuel vapor processing system incorporating a fuel vapor processing apparatus 10 according to a first embodiment. The fuel vapor processing apparatus 10 may be also called as a canister and may include a container 12 made of resin. The container 12 may include a rectangular tubular container body 13 and a closure member 14. The container body 13 may have a closed front end (upper end in FIG. 1) and an opened rear end (lower end in FIG. 1). The closure member 14 may be configured to close the opened rear end of the container body 13. A partition wall 15 may divide the internal space of the container body 13 into a main adsorption chamber 17 positioned on the right side and an auxiliary adsorption chamber 18 positioned on the left side. Each of the main adsorption chamber 17 and the auxiliary adsorption chamber 18 may have a rectangular tubular shape and may communicate with each other via a communication passage 20 defined within the rear end (lower end in FIG. 1) on the inner side of the closure member 14.

The front end (upper end in FIG. 1) of the container body 13 may be formed with a tank port 22 and a purge port 23 each communicating with the main adsorption chamber 17, and an atmospheric air introduction port 24 communicating with the auxiliary adsorption chamber 18. The tank port 22 may be connected to a gaseous region within a fuel tank 27 via a fuel vapor passage 26. The purge port 23 may be connected to an intake pipe 32 of an engine 31 via a purge passage 30. The engine 31 may be an internal combustion engine of a vehicle, such as an automobile. The intake pipe 32 may have a throttle valve 33 that may control the flow rate of air supplied to the engine 31. The purge passage 30 may be connected to the intake pipe 32 at a position on the downstream side of the throttle valve 33. A purge valve 34 may be disposed in the purge passage 30 and may be opened and closed under the control of an engine control unit (ECU) (not shown). The atmospheric port 24 may be opened into the atmosphere and may serve as an atmospheric air introduction portion.

Front filters 36 may be respectively disposed at the front ends of the main adsorption chamber 17 and the auxiliary adsorption chamber 18. A separation wall 35 may separate the front end portion of the main adsorption chamber 17 into a right-side region communicating with the tank port 22 and a left-side region communicating with the purge port 23. Therefore, the front filters 36 that are two in number are respectively disposed at the right-side region and the left-side region of the front end of the main adsorption chamber 17. Rear filters 37 may be respectively disposed at the rear ends of the main adsorption chamber 17 and the auxiliary adsorption chamber 18. Each of the front and rear filters 36 and 37 may be formed of non-woven fabric made of resin or may be formed of methane foam, etc. Perforated plates 38 may be respectively disposed within the main adsorption chamber 17 and the auxiliary adsorption chamber 18 at positions on the rear side (lower side in FIG. 1) of the rear filters 37 so as to extend along the rear surfaces of the rear filters 37. A spring 40 may be interposed between the closure member 14 and each of the perforated plates 38. The spring 40 may be a coil spring.

Granular adsorption materials 42 may be respectively filled within the main adsorption chamber 17 and the auxiliary adsorption chamber 18, more specifically, within spaces defined between the front filters 36 and the rear filters 37. The granular adsorption material 42 may be activate carbon granules. For example, the activated carbon granules may be broken activated carbon or may be granulated activated carbon manufactured by a granulation process of a mixture of granular or powder activated carbon and a binder.

A first heater 50 may be disposed within the auxiliary adsorption chamber 18 and may have a heat generation element that generates heat when electrically energized. The first heater 50 may have a shape like a rectangular sheet and may be located within the auxiliary adsorption chamber 18, more specifically, within a space defined between the front filter 36 and the rear filter 37, such that opposite sheet surfaces of the first heater 50 face upward and downward (the front and back direction with respect to a paper surface of FIG. 1) and the first heater 50 is embedded within the activated carbon granules of the adsorption material 42 of the auxiliary adsorption chamber 18.

A second heater 60 may be disposed within the main adsorption chamber 17. Similar to the first heater 50, the second heater 60 may have a heat generation element that generates heat when electrically energized. In addition, the second heater 60 may have a shape like a rectangular sheet and may be positioned with the main adsorption chamber 17 such that the opposite surfaces of the sheet face upward and downward and the first filter 50 is embedded within the activate carbon granules of the adsorption material 42 of the main adsorption chamber 17.

The operation of the fuel vapor processing system incorporating the fuel vapor processing apparatus 10 will now be described with reference to FIG. 1. The fuel vapor processing system may include the fuel vapor processing apparatus 10, the fuel vapor passage 26, the fuel tank 27, the purge passage 30, the intake pipe 32 and the purge valve 34.

When the engine 31 is stopped, the ECU may close the purge valve 34, so that fuel vapor produced within the fuel tank 27 may be introduced into the main adsorption chamber 17 via the fuel vapor passage 26 and the tank port 22. The adsorption material 42 of the main adsorption chamber 17 may then adsorb the introduced fuel vapor. If the adsorption material 42 of the main adsorption chamber 17 has not adsorbed a part of the introduced fuel vapor, such a part of the introduced fuel vapor may be introduced into the auxiliary adsorption chamber 18 and may be adsorbed by the adsorption material 42 of the auxiliary adsorption chamber 18.

During the driving operation of the engine 31, the ECU may open the purge valve 34, so that a negative pressure of the intake air may be applied to the purge port 23 of the container 12 of the fuel vapor processing apparatus 10. In conjunction with this, the atmospheric air (fresh air) may be introduced into the auxiliary adsorption chamber 18 via the atmospheric port 24. The air introduced into the auxiliary adsorption chamber 18 may desorb fuel vapor from the adsorption material 42 of the auxiliary adsorption chamber 18. The air may be further introduced into the main adsorption chamber 17 via the communication passage 20 and may desorb fuel vapor from the adsorption material 42 of the main adsorption chamber 17. The air containing the fuel vapor desorbed from the adsorption materials 42 may be discharged or purged into the intake pipe 32 via the purge passage 30 and may be subsequently burned in the engine 31.

During the desorption process of fuel vapor from the adsorption materials 42 of the auxiliary adsorption chamber 18 and the main adsorption chamber 17, a power source voltage may be applied to the heat generation elements of the first heater 50 and the second heater 60 via the ECU, so that the first and second heaters 50 and 60 generate heat. The heat generated by the first and second heaters 50 and 60 may be radiated to the adsorption materials 42 positioned around these heaters 50 and 60. Then, the fuel vapor adsorbed onto the surfaces of the adsorption materials 42 may be heated. In this way, it is possible to inhibit the adsorption materials 42 from being lowered in temperature by the endothermic reaction caused when the fuel vapor is desorbed. As a result, it is possible to improve the fuel vapor desorption efficiency and to promptly recover the adsorption ability of the adsorption materials 42.

Figure 3A:
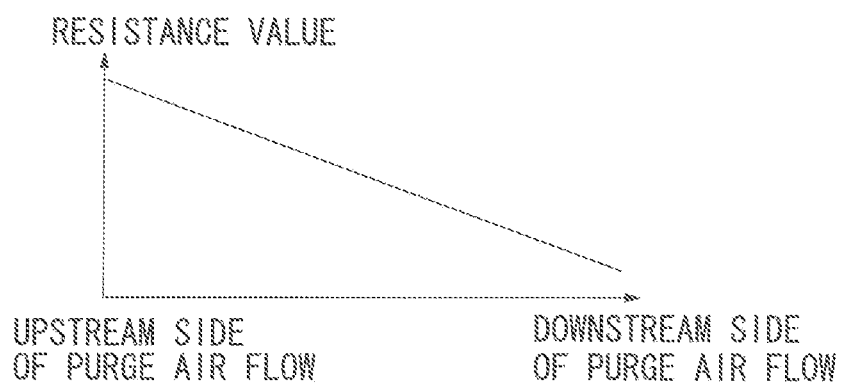
FIGS. 3(A) and 3(B) are graphs showing characteristics of the first heater.
Figure 3B:
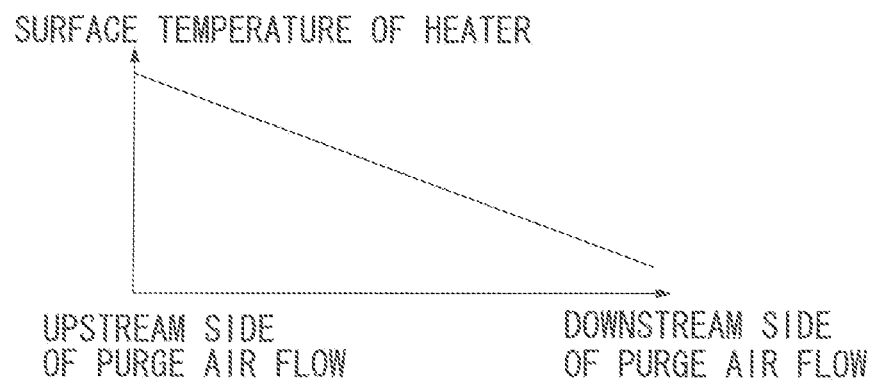

The first heater 50 is shown in FIG. 2. A known flat sheet-like heater may be used as the first heater 50. As shown in FIG. 3(A), the first heater 50 may have such a characteristic that an electric resistance progressively decreases in a direction from an upstream side toward a downstream side with respect to the flow of purge air (i.e., the flow of the atmospheric air during desorption of fuel vapor). Therefore, when an electric voltage is applied to the first heater 50 as shown in FIG. 2 to generate Joule heat, the surface temperature of the first heater 50 may progressively decrease along the length of the first heater 50 in a direction from an upstream side toward a downstream side with respect to the flow of purge air as shown in FIG. 3(B).

As described previously, the first heater 50 is embedded within the adsorption material 42 of the auxiliary adsorption chamber 18 as shown in FIG. 1. In particular, in this embodiment, the first heater 50 is oriented such that its one end having a highest electric resistance is positioned nearer to the atmospheric port 24.

Therefore, when the adsorption material 42 of the auxiliary adsorption chamber 18 is heated by the first heater 50, the adsorption material 42 has such a temperature distribution that the temperature progressively decreases along the length of the adsorption material 42 in a direction from the side of the atmospheric port 24 toward the downstream side with respect to the flow of the atmospheric air during the desorption process. In this way, without accompanying increase in the power consumption of the first heater 50 as a whole, it is possible to inhibit the fuel vapor from being remained at the adsorption, material 42 located nearer to the atmospheric port 24. Hence, it is possible to inhibit fuel vapor adsorbed by the adsorption material 42 located nearer to the atmospheric port 24 from being discharged to the atmosphere during the desorption process performed when the engine 31 is stopped.

In addition, because the first heater 50 is configured as an electrical resistance heater, the above-described temperature distribution of the heating value can be easily achieved by the adjustment of the distribution of the electric resistance. Further, the first heater 50 that is a single heater can easily realize a progressively changing temperature distribution.

The second heater 60 may be configured to be similar to the first heater 50 and may have such a characteristic that an electric resistance progressively decreases along its length in a direction from an upstream side toward a downstream side with respect to the flow of purge air. However, it may be also possible that the second heater 60 has a uniform electric resistance along its length in a direction from an upstream side toward a downstream side with respect to the flow of purge air.

Because the supply of electric power to the first heater 50 and the second heater 60 disposed within the container 12 may be performed via the ECU that may be located externally of the container 12, the electric wiring for the supply of electric power may extend through a portion of the container 12, which may be suitably chosen.

Figure 4:
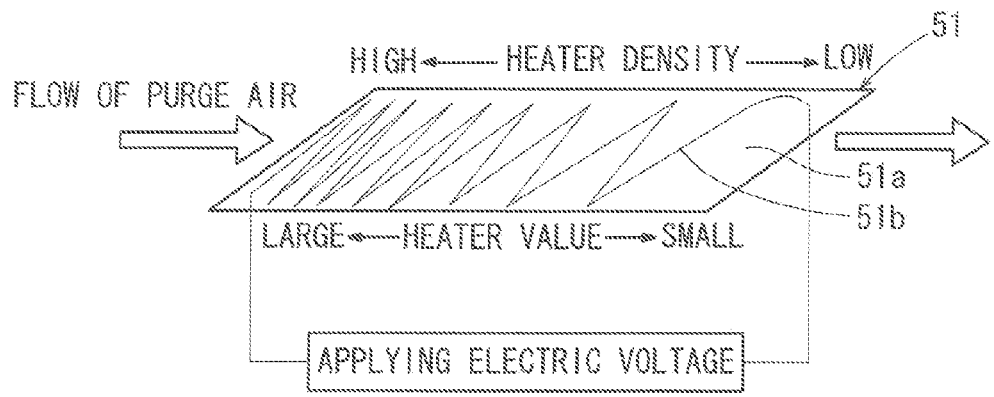
FIG. 4 is a schematic perspective view of a first heater of a fuel vapor processing apparatus according to a second embodiment.

Second, third, and fourth embodiments will now be described with reference to FIGS. 4, 5 and 6. These embodiments are modifications of the first embodiment. Therefore, in FIGS. 4 to 6, like members are given the same reference numerals as the first embodiment, and the description of these members will not be repeated.

<Second Embodiment>

The second embodiment is shown in FIG. 2 and is different from the first embodiment in that a first heater 51 corresponding to the first heater 50 of the first embodiment may include a substrate 51a and a heat generating wire 51b wired on the substrate 51a. The wiring density of the heat generating wire 51b may be determined such that it progressively decreases along the length of the substrate 51a in a direction from the side of the atmospheric port 24 toward the downstream side with respect to the flow of the purge air during the desorption process. Therefore, when an electric voltage is applied to the heat generating wire 51b of the first heater 51 to generate Joule heat as shown in FIG. 4, similar to the characteristic shown in FIG. 3(B) of the first embodiment, the surface temperature of the first heater 51 may progressively decrease along the length of the first heater 51 in a direction from an upstream side toward a downstream side with respect to the flow of purge air.

The first heater 51 may be embedded within the adsorption material 42 of the auxiliary adsorption chamber 18 such that its one end having a highest wiring density is positioned nearer to the atmospheric port 24.

Also with the second embodiment, the adsorption material 42 of the auxiliary adsorption chamber 18 may have such a temperature distribution that the temperature progressively decreases along its length in a direction from the side of the atmospheric port 24 toward the downstream side with respect to the flow of the atmospheric air during the desorption process. In this way, it is possible to inhibit the fuel vapor from being remained at the adsorption material 42 located nearer to the atmospheric port 24, and hence, it is possible to inhibit fuel vapor adsorbed by the adsorption material 42 located nearer to the atmospheric port 24 from being discharged to the atmosphere during the desorption process performed when the engine 31 is stopped.

<Third Embodiment>

Figure 5:
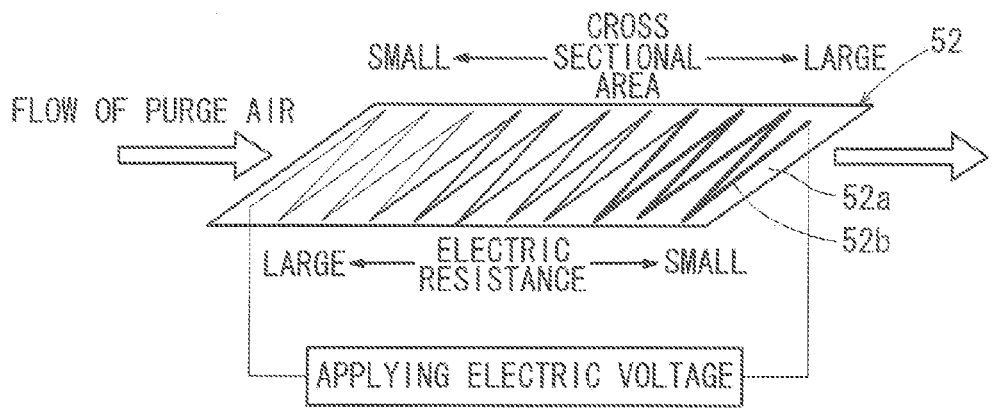
FIG. 5 is a schematic perspective view of a first heater of a fuel vapor processing apparatus according to a third embodiment.

The third embodiment is shown in FIG. 5 and is different from the first embodiment in that a first heater 52 corresponding to the first heater 50 of the first embodiment may include a substrate 52a and a heat generating wire 52b wired on the substrate 52a. The heat generating wire 52b may have a cross sectional area (thickness) that progressively increases along its length from its one end positioned on the side of the atmospheric port 24 toward its opposite end positioned on the downstream side with respect to the flow of the purge air during the desorption process. Therefore, similar to the characteristic shown in FIG. 3(A) of the first embodiment, an electric resistance of the heat generation wire 52b may progressively decrease along its length in a direction from an upstream side toward a downstream side with respect to the flow of purge air. Hence, when an electric voltage is applied to the heat generating wire 52b of the first heater 52 to generate Joule heat as shown in FIG. 5, similar to the characteristic shown in FIG. 3(B) of the first embodiment, the surface temperature of the first heater 52 may progressively decrease along the length of the first heater 52 in a direction from an upstream side toward a downstream side with respect to the flow of purge air.

The first heater 52 may be embedded within the adsorption material 42 of the auxiliary adsorption chamber 18 such that its one end having a smallest cross sectional area is positioned nearer to the atmospheric port 24.

Also with the third embodiment, the adsorption material 42 has such a temperature distribution that the temperature progressively decreases along its length from the side of the atmospheric port 24 toward the downstream side with respect to the flow of the atmospheric air during the desorption process. In this way, without accompanying increase in the power consumption of the first heater 52 as a whole, it is possible to inhibit the fuel vapor from being remained at the adsorption material 42 located nearer to the atmospheric port 24. Hence, it is possible to inhibit fuel vapor adsorbed by the adsorption material 42 located nearer to the atmospheric port 24 from being discharged to the atmosphere during the desorption process performed when the engine 31 is stopped.

<Fourth Embodiment>

Figure 6:
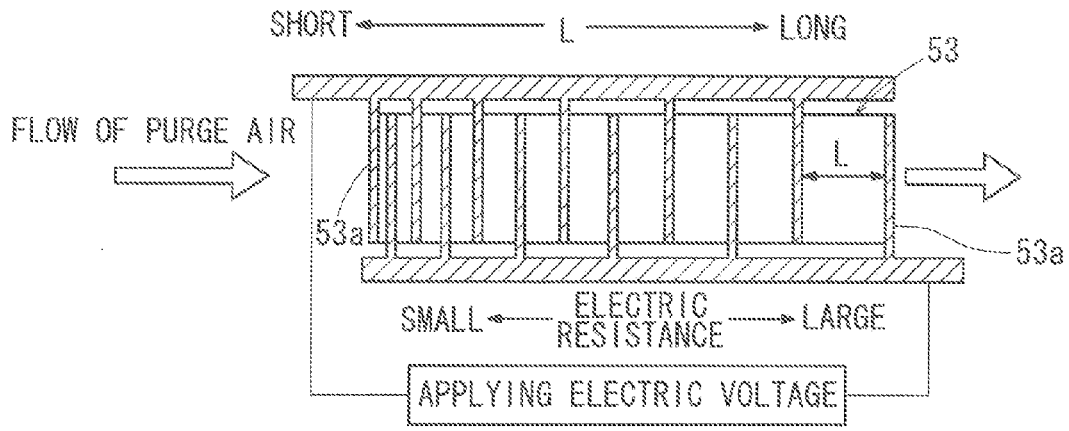
FIG. 6 is a schematic sectional view of a first heater of a foci vapor processing apparatus according to a forth embodiment.

The fourth embodiment is shown in FIG. 6 and is different from the first embodiment in that a first heater 53 corresponding to the first heater 50 of the first embodiment includes a plurality of different heating sections along its length in a direction of flow of the purge air. The heating sections may be electrically connected in parallel to each other. In this embodiment, the heating sections may have the same electric resistance per unit area, and each of the heating sections are defined between two electrodes 53a. However, the areas of the heating sections are determined such that, the area of any of the heating sections is larger than that of the other heating section positioned on its the upstream side with respect to the direction of flow of the purge air. In other words, the area of the heating section increases along the length of the first heater 53 in the direction toward the downstream side. More specifically, a length L between two adjacent electrodes 53a of each heating section is determined such that the length L becomes longer along the length of the first heater 53 in the direction toward the downstream side as shown in FIG. 6.

Therefore, when an electric voltage is applied between two adjacent electrodes 53a of each heating section of the first heater 53 to generate Joule heat, similar to the characteristic shown in FIG. 3(B) of the first embodiment, the surface temperature of the first heater 53 may progressively decrease along the length of the first heater 53 in a direction from an upstream side toward a downstream side with respect to the flow of purge air.

The first heater 53 may be embedded within the adsorption material 42 of the auxiliary adsorption chamber 18 such that the heating section having a smallest length L is positioned nearer to the atmospheric port 24.

Also with the fourth embodiment, the adsorption material 42 has such a temperature distribution that the temperature progressively decreases along its length in a direction front the side of the atmospheric port 24 toward the downstream side with respect to the flow of the atmospheric air during the desorption process. In this way, without accompanying increase in the power consumption of the first heater 53 as a whole, it is possible to inhibit the fuel vapor from being remained at the adsorption material 42 located nearer to the atmospheric port 24. Hence, it Is possible to inhibit fuel vapor adsorbed by the adsorption material 42 located nearer to the atmospheric port 24 from being discharged to the atmosphere during the desorption process performed when the engine 31 is stopped.

<Possible Modifications>

The above embodiments may be modified in various ways. For example, the adsorption material 42 of each of the man adsorption chamber 17 and the auxiliary adsorption chamber 18 may be divided into two or more layers. Although the temperature distribution that the temperature progressively decreases in a direction from the side of the atmospheric port 24 toward the downstream side is achieved by using a single heater in each of the above embodiments, two or more heaters having different heating values may be combined for achieving a similar temperature distribution.

What is claimed is:

1. A fuel vapor processing apparatus comprising:
   a container including an atmospheric introduction portion, through which atmospheric air is introduce into the container;
   an adsorption material contained in the container and configured to adsorb fuel vapor and to allow the adsorbed fuel vapor to be desorbed from the adsorption material as the atmospheric air introduced into the container flows through the adsorption material; and
   a heater configured to heat the a sorption material for promoting desorption of fuel vapor;
   wherein the adsorption material heated by the heater has such a temperature distribution that a temperature of the adsorption material progressively decreases along a length of the adsorption material in a flow direction of the atmospheric air through the adsorption material for desorption of fuel vapor;
   wherein the heater is an electrical resistance heater that generates Joule heat;
   wherein an electric resistance of the heater progressively decreases along a length of the heater in the flow direction of the atmospheric air through the adsorption material;
   wherein the heater includes a heat generation wire that generates heat when an electric voltage is applied; and
   wherein the heat generation wire is wired such that a wiring density progressively decreases along the length of the heater in the flow direction of the atmospheric air through the adsorption material.

2. A fuel vapor processing processing apparatus comprising:
   container including an atmospheric introduction portion, through which atmospheric air is introduce into the container:
   an adsorption material contained in the container and configured to adsorb fuel vapor and to allow the adsorbed fuel vapor to be desorbed from the adsorption material as the atmospheric air introduced into the container flows through the adsorption material; and
   a heater configured to heat the adsorption material for promoting desorption of fuel vapor;
   wherein the adsorption material heated by the heater has such a temperature distribution that a temperature of the adsorption material progressively decreases along a length of the adsorption material in a flow direction of the atmospheric air through the adsorption material for desorption of fuel vapor;

wherein the heater is an electrical resistance heater that generates Joule heat;

wherein an electric resistance of the heater progressively decreases along a length of the heater in the flow direction of the atmospheric air through the adsorption material;

wherein the heater includes a heat generation wire that generates heat when an electric voltage is applied; and wherein the heat generation wire has a cross sectional area that progressively increases along the length of the heat generation wire in the flow direction of the atmospheric air through the adsorption material.

3. A fuel vapor processing apparatus comprising:

a container including an atmospheric introduction portion, through atmospheric air is introduce into the container;

an adsorption material contained in the container and configured to adsorb fuel vapor and to allow the adsorbed fuel vapor to be desorbed from the adsorption material as the atmospheric air introduced into the container flows through the adsorption material; and a heater configured to heat the adsorption material for promoting desorption of fuel vapor;

wherein the adsorption material heated by the heater has such a temperature distribution that a temperature of the adsorption material progressively decreases along a length of the adsorption material in a flow direction of the atmospheric air through the adsorption material for desorption of fuel vapor;

wherein the heater is an electrical resistance heater that generates Joule heat;

wherein an electric resistance of the heater progressively decreases along a length of the heater in the flow direction of the atmospheric air through the adsorption material;

wherein the heater further includes a plurality of electrodes spaced from each other in the flow direction of the atmospheric air through the adsorption material, so that a heating section is defined between each two adjacent electrodes of the plurality of electrodes; and wherein a length of the heat section progressively increases along the length of the heater in the flow direction of the atmospheric air through the adsorption material.

4. A fuel vapor processing apparatus comprising:

a container including an atmospheric introduction portion, through which atmospheric air is introduce into the container;

an adsorption material contained in the container and configured to adsorb fuel vapor and to allow the adsorbed fuel vapor to be desorbed from the adsorption material as the atmospheric air introduced into the container flows through the adsorption material; and a heater configured to heat the adsorption material for promoting desorption of fuel vapor;

wherein a heating value of the heater progressively decreases along a length of the heater in the flow direction of the atmospheric air through the adsorption material;

wherein the heater is an electrical resistance heater that generates Joule heat;

wherein the heater has an electric resistance that progressively decreases in the flow direction of the atmospheric air through the adsorption material;

wherein the heater includes a heat generation wire that generates heat when an electric voltage is applied; and wherein the heat generation wire is wired such that a wiring density becomes progressively lower in the flow direction of the atmospheric air through the adsorption material.

5. A fuel vapor processing apparatus comprising:

a container including an atmospheric introduction portion, through which atmospheric air is introduce into the container;

an adsorption material contained in the container and configured to adsorb fuel vapor and to allow the adsorbed fuel vapor to be desorbed from the adsorption material as the atmospheric air introduced into the container flows through the adsorption material; and a heater configured to heat the adsorption material for promoting desorption of fuel vapor;

wherein a heating value of the heater progressively decreases along a length of the heater in the flow direction of the atmospheric air through the adsorption material;

wherein the heater is an electrical resistance heater that generates Joule heat;

wherein the heater has an electric resistance that progressively decreases in the flow direction of the atmospheric air through the adsorption material:

wherein the heater includes a heat generation wire that generates heat when an electric voltage is applied; and wherein the heat generation wire has a cross sectional area that becomes progressively larger in the flow direction of the atmospheric air through the adsorption material.

* * * * *